United States Patent
Sim et al.

(10) Patent No.: US 9,307,143 B2
(45) Date of Patent: Apr. 5, 2016

(54) MULTIMODAL CAMERA AND A METHOD FOR SELECTING AN OPERATION MODE OF A CAMERA

(75) Inventors: Wong Hoo Sim, Singapore (SG); Toh Onn Desmond Hii, Singapore (SG)

(73) Assignee: Creative Technology Ltd, Singapore (SG)

( * ) Notice: Subject to any disclaimer, the term of this patent is extended or adjusted under 35 U.S.C. 154(b) by 538 days.

(21) Appl. No.: 13/319,799

(22) PCT Filed: Apr. 19, 2010

(86) PCT No.: PCT/SG2010/000157
§ 371 (c)(1),
(2), (4) Date: Nov. 10, 2011

(87) PCT Pub. No.: WO2010/132025
PCT Pub. Date: Nov. 18, 2010

(65) Prior Publication Data
US 2012/0069141 A1    Mar. 22, 2012

(30) Foreign Application Priority Data

May 11, 2009  (SG) .............................. 200903222-8

(51) Int. Cl.
| | | |
|---|---|---|
| *H04N 5/232* | (2006.01) | |
| *H04N 5/235* | (2006.01) | |
| *G03B 35/02* | (2006.01) | |
| *G03B 37/02* | (2006.01) | |
| *H04N 13/02* | (2006.01) | |

(52) U.S. Cl.
CPC ......... *H04N 5/23222* (2013.01); *H04N 5/2355* (2013.01); *H04N 5/23232* (2013.01); *H04N 5/23238* (2013.01); *H04N 5/23245* (2013.01); *G03B 35/02* (2013.01); *G03B 37/02* (2013.01); *H04N 5/23254* (2013.01); *H04N 5/23258* (2013.01); *H04N 13/0296* (2013.01)

(58) Field of Classification Search
None
See application file for complete search history.

(56) References Cited

U.S. PATENT DOCUMENTS

| | | | | |
|---|---|---|---|---|
| 5,159,375 | A * | 10/1992 | Taniguchi et al. | 396/56 |
| 5,627,622 | A * | 5/1997 | Ootsuka et al. | 396/242 |
| 2003/0193690 | A1* | 10/2003 | Inuiya | 358/1.15 |
| 2004/0008274 | A1* | 1/2004 | Ikari et al. | 348/370 |
| 2005/0140803 | A1* | 6/2005 | Ohtsuka et al. | 348/239 |
| 2008/0158342 | A1* | 7/2008 | Jeong et al. | 348/36 |
| 2008/0239135 | A1* | 10/2008 | Tamura | 348/335 |
| 2009/0033767 | A1* | 2/2009 | Fujiyama | 348/231.2 |

* cited by examiner

*Primary Examiner* — Kevin McInnish
(74) *Attorney, Agent, or Firm* — Russell Swerdon; Desmund Gean

(57) ABSTRACT

A multimodal camera and a method for selecting an operation mode of a camera, the method comprising: sensing scene lighting; detecting movement of the camera including detection of rotational movement for Panorama photography; detecting selection of a selector of the camera, the selector being for selecting between a first set of one or more operation modes based on scene lighting and a second set of one or more operation modes based on movement of the camera; and selecting one of the operation modes from the first and second sets of one or more operation modes based on conditions defined by data associated with the movement of the camera, the scene lighting, and the selection of the selector.

10 Claims, 5 Drawing Sheets

MULTIMODAL CAMERA AND A METHOD FOR SELECTING AN OPERATION MODE OF A CAMERA

FIELD OF INVENTION

The present invention relates to a multimodal camera and a method for selecting an operation mode of a camera.

BACKGROUND

In a conventional digital camera, operation modes for camera functions such as picture/video playback, video capturing, picture taking with manual settings, picture taking with automatic settings etc., are typically selected by turning a main dial located on the camera or selected by controlling a directional keypad.

Another use for the main dial and/or directional keypad is to allow one to select the best settings for taking a particular picture. For instance, the main dial and/or directional keypad may be used for toggling between operation modes, such as night picture mode, portrait mode, close-up picture mode, scenery mode, sports mode, etc.

It has been observed that nothing else other than the main dial and/or directional keypad could be found in conventional digital cameras to provide further user convenience for selection between camera operation modes.

A need therefore exists to provide a multimodal camera and a method for selecting an operation mode of a camera that addresses at least the above-mentioned problem.

SUMMARY

In accordance with an aspect of the present invention, there is provided a method for selecting an operation mode of a camera, the method comprising sensing scene lighting, detecting movement of the camera including detection of rotational movement for Panorama photography, detecting selection of a selector of the camera, the selector being for selecting between a first set of one or more operation modes based on scene lighting and a second set of one or more operation modes based on movement of the camera, and selecting one of the operation modes from the first and second sets of one or more operation modes based on conditions defined by data associated with the movement of the camera, the scene lighting, and the selection of the selector.

The method may further comprise detecting duration of hold time on the selector, wherein the data associated with the selection of the selector comprises data associated with the duration of hold time on the selector.

The method may further comprise determining state of the selector, wherein the data associated with the selection of the selector comprises data associated with the state of a selector.

The method may further comprise facilitating capturing of more than one images under the operation mode, the operation mode being one of a group consisting of Panorama photography mode, Stereoscopic photography mode, Burst photograph taking mode, High Dynamic Range imaging mode, or Super Resolution photography mode.

The method may further comprise selecting the first set of one or more operation modes through a first button of the selector and selecting the second set of one or more operation modes through a second button of the selector.

The method may further comprise alarming and guiding a user of the camera to fulfill conditions for image capturing under the operation mode.

The method may further comprise determining shutter speed of the camera and selecting the operation mode based on further conditions defined by data associated with the shutter speed of the camera.

Detecting the movement of the camera may comprise comparison between images captured by the light sensor at predetermined time intervals.

Detecting the movement of the camera may comprise using a digital compass, an inertial sensor or both.

The conditions defined by data associated with the movement of the camera, the selection of the selector, and scene lighting, may be fixed or evolved and adapt to user selection patterns.

The method may further comprise displaying one or more selectable options in a display; and selecting the one or more selectable options to select or exit an operation mode.

In accordance with another aspect of the present invention, there is provided a multimodal camera comprising a light sensor for sensing scene lighting, movement detection means for detecting movement of the camera including detection of rotational movement for Panorama photography, a selector for selecting between a first set of one or more operation modes based on scene lighting and a second set of one or more operation modes based on movement of the camera, and a processing unit for selecting one of the operation modes from the first and second sets of one or more operation, modes based on conditions defined by data associated with the movement of the camera, the scene lighting, and the selection of the selector.

The multimodal camera may further comprise a timer for counting duration of hold time on the selector, wherein the data associated with the selection of the selector comprises data associated with the duration of hold time on the selector.

The data associated with the selection of the selector may comprise data associated with state of the selector.

The operation mode may facilitate capturing of more than one images, the operation mode being one of a group consisting of Panorama photography mode, Stereoscopic photography mode, Burst photograph taking mode, High Dynamic Range imaging mode, or Super Resolution photography mode.

The selector may comprise two buttons, one of which is for selecting the first set of one or more operation modes, and the other is for selecting the second set of one or more operation modes.

Alarming means may be provided to alarm and guide a user of the camera to fulfill conditions for image capturing under the operation mode.

The processing unit may be used in determining shutter speed of the camera, the selected operation mode being selected by the processing unit based on further conditions defined by data associated with the shutter speed of the camera.

The movement of the camera may be detected based on comparison between images captured by the light sensor at predetermined time intervals.

The movement detection means may comprise a digital compass, an inertial sensor or both.

The conditions defined by data associated with the movement of the camera, the selection of the selector, and scene lighting, may be fixed or evolved and adapt to user selection patterns.

The selector may comprise one or more selectable options presented graphically in a display of the camera, wherein selecting the one or more selectable options select or exit an operation mode.

BRIEF DESCRIPTION OF THE DRAWINGS

Embodiments of the invention will be better understood and readily apparent to one of ordinary skill in the art from the following written description, by way of example only and in conjunction with the drawings, in which.

DETAILED DESCRIPTION

Figure 1:
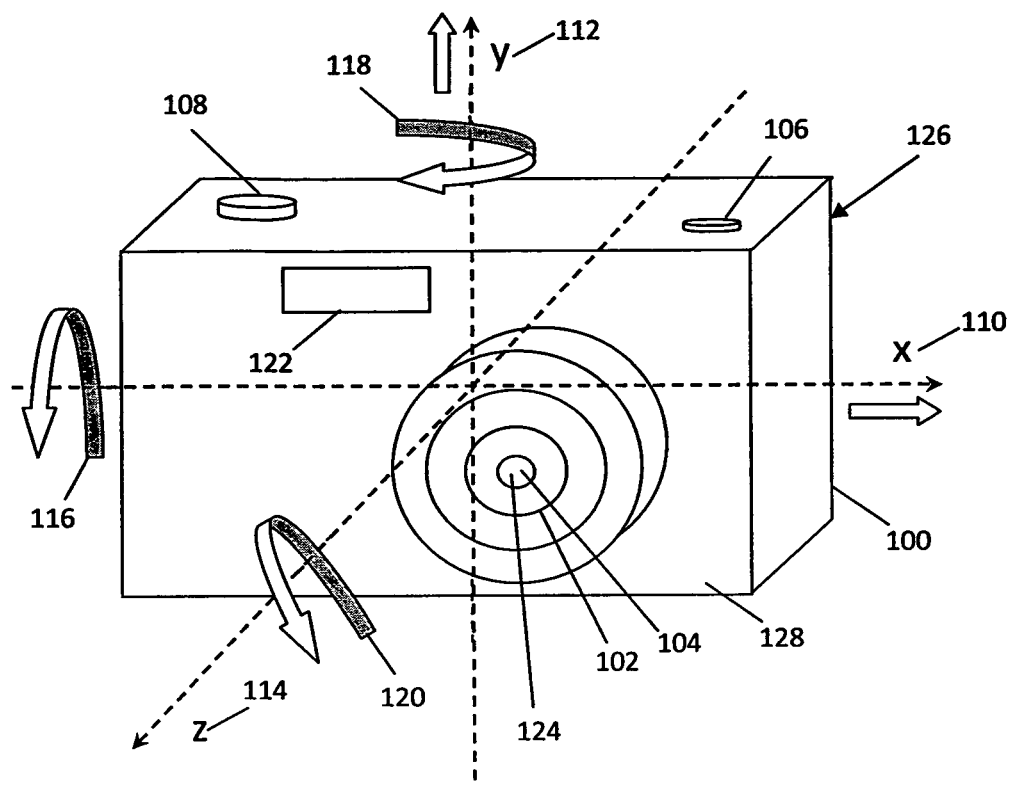
FIG. 1 shows a front perspective view of a camera of an example embodiment of the present invention.

An example embodiment of the present invention includes a camera capable of automatic seamless selection and transition between two or more of the following photography-based operation modes, i.e. Panorama photography, High Dynamic Range (HDR) imaging, Burst photograph taking, Super Resolution photography, Stereoscopic [i.e. Three Dimensional (3D)] photography and Regular still image capture.

Generally, the automatic selection and transition between the operation modes is selected based on conditions defined by data associated with movement of the camera, selection of a selector, and scene lighting sensed by a light sensor of the camera. The selector is used for selecting between a first set of one or more operation modes based on scene lighting and a second set of one or more operation modes based on movement of the camera. In the example embodiment, the first set of operation modes is HDR imaging mode, the Super Resolution photography mode, and the Regular still image capture mode. The second set of operation modes is Panorama photography mode, Burst mode and Stereoscopic photography mode. It is appreciated that the light sensor may include one or more photodiodes, photosensitive elements, Charged-Coupled Device (CCD) based photoelectric light sensors, Complementary Metal Oxide Semiconductor (CMOS) based photoelectric light sensors, and the like.

In the example embodiment, there is provided a processing unit for selecting an operation mode of the camera for facilitating capturing of one or more images, determining movement of the camera based on input from the detection means, determining scene lighting conditions based on input from the light sensor, and determining the selection of the selector. Light is focused on the light sensor with the aid of camera lens. The processing unit processes the lighting data derived based on the light focused on the light sensor. Camera movement is detected using a digital compass and an inertial sensor, which are incorporated in the camera. It is appreciated that the inertial sensor may include a gyroscope and an accelerometer. It is appreciated that camera movement may also be detected using image registration/tracking (in short, imaging) i.e. comparison of digital data representative of images captured by the light sensor. For better accuracy, image registration/tracking, one or more digital compasses and one or more inertial sensors may be used together. Data associated with the selection of the selector depends on the type of selector being used. For instance, in the case of using the shutter trigger of the camera as the selector, data associated with the selection of the selector include state (ON or OFF) of the shutter trigger and duration of hold time on the shutter trigger.

In the example embodiment, the Panorama photography mode involves creating panoramic photographs, i.e. continuous wide angle representation of a scene. For instance, by stitching two or more photographs of a scene having overlaps, which are taken adjacent to one another, one panoramic photograph representing the entire scene can be formed.

The HDR imaging mode involves techniques that allow a greater dynamic range of luminance between light and dark areas of a scene. For instance, by fusing two or more photographs with different light exposure levels, one lighting enhanced photograph can be formed.

The Burst photograph taking or Burst mode involves taking two or more regular still photographs consecutively within a short time interval.

The Super Resolution mode involves techniques that enhance the resolution of an imaging system e.g. techniques that break the resolution limit of the camera digital imaging sensor. For instance, by fusing together several low-resolution photographs, one enhanced-resolution photograph can be formed.

Stereoscopic photography mode involves techniques for creating 3D images, for instance, shooting and merging two or more photographs of a subject that are taken from different angles of the subject to form a 3D photograph.

The Regular still image capture mode in the example embodiment refers to the shooting of normal photographs.

Figure 2:
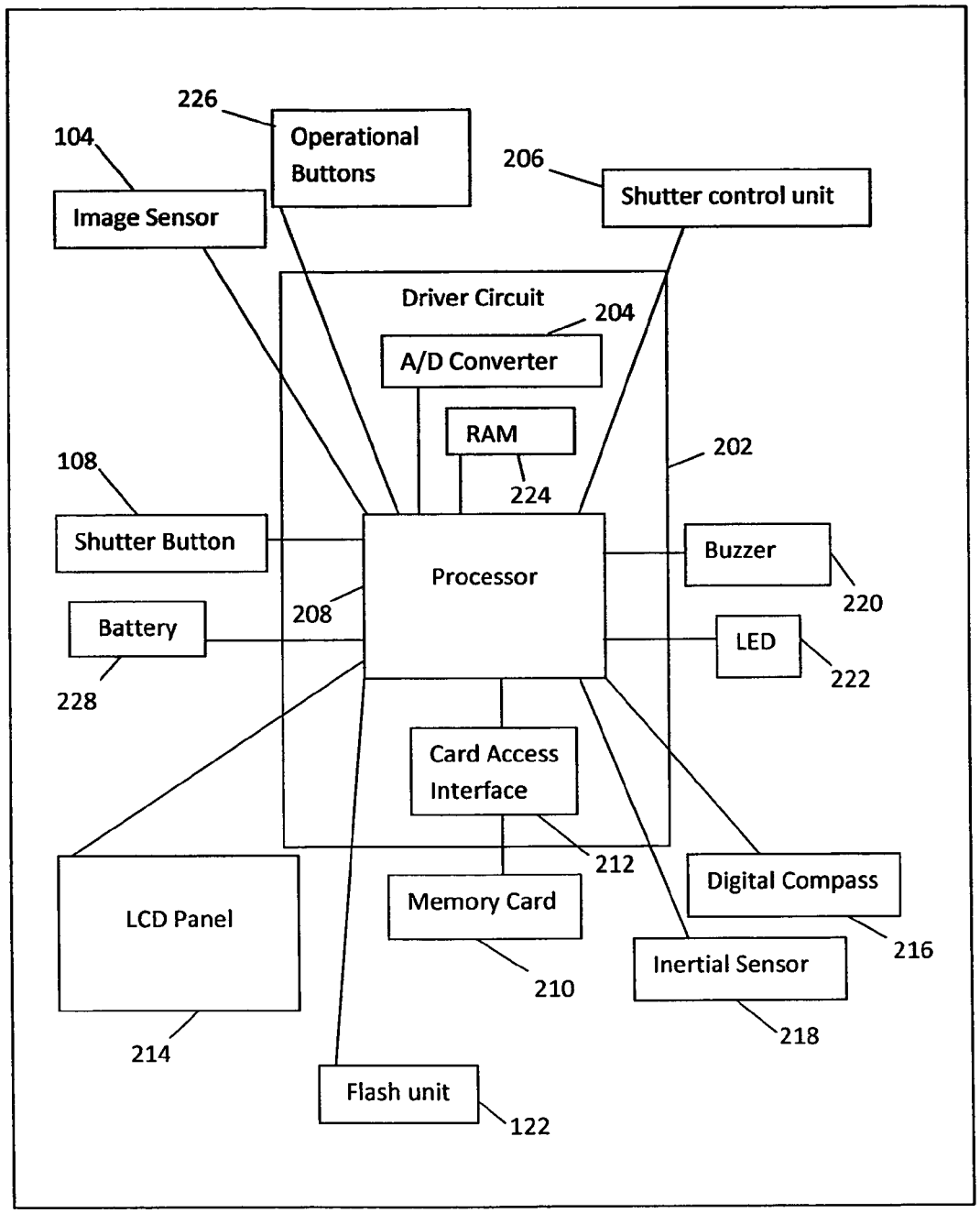
FIG. 2 shows a block diagram of the components of an example embodiment of the present invention.

With reference to FIGS. 1 and 2, the example embodiment provides a handheld digital camera 100. The camera 100 includes lens 102 for focusing an image of a subject on a light sensor 104 located in the camera 100 adjacent to the lens 102. There is provided an on-off switch 106 for powering the camera 100 on or off for photograph taking. There is also provided a retractable shutter trigger (also known herein as shutter button) 108 (i.e. the selector) for shooting photographs by pressing on the shutter button 108. In addition, there are provided a flash unit 122 located on a front panel 128 of the camera 100 for helping to illuminate a scene for photograph taking and a battery 228 for powering the camera 100. The light sensor 104 is clocked by a driver circuit 202 to produce an analogue image signal corresponding to a still image of the subject, and the image signal is converted to a digital image signal by an analog-to-digital (ND) converter 204. The exposure time of the image on the light sensor 104 is controlled by a shutter control unit 206 including a diaphragm 124 adjacent to the lens 102, which regulates the aperture size of the lens 102, and by electronic shuttering of the light sensor 104 controlled by the driver circuit 202. The aperture size is measured in units of f/stops (e.g. f/2.8) and it is indicative of the speed and the amount of light that will enter the lens 102 and be focused onto the light sensor 104. The shutter button 108 is connected to the driver circuit 202. Pressing the shutter button 108 activates the electronic shuttering to allow light to reach the light sensor 104 for image capturing. It is appreciated that alternatively a mechanical shutter (not shown in the Figures) can be used.

A plurality of operation buttons 226 in the form of a four-way directional button is located on a rear panel 126 of the camera 100 to enable user selection and activation of the functions of the camera 100. It is appreciated that in other example embodiments, there could be just one button for activation purposes, and/or a joystick or four operation buttons configured as a four way directional key panel, which enables scrolling. It is appreciated that the plurality of operation buttons 226 may be omitted in the design of the camera 100 if selection and activation of the functions of the camera 100 is to be performed through the use of a touch screen.

During photograph taking, the digital image signal of a captured image is processed by an processing unit 208, which is part of the driver circuit 202, and stored in a digital memory module, i.e. a removable solid-state memory card 210 for storing a plurality of processed digital images. A memory card access interface 212 connects the memory card 210 to the processing unit 208. Examples of types of the memory card 210 include Secure Digital (SD), Mini SD, Micro SD, Secure Digital High Capacity (SDHC), Multimedia Card (MMC), Compact Flash (CF), Memory Stick PRO; Memory Stick Duo, Memory Stick PRO Duo, Memory Stick Micro (M2), Memory Stick PRO-HG, and the like. Alternatively, it is appreciated that the digital memory module could be a hard disk, magnetic tape, optical disk and the like instead of the memory card 210.

There is provided a display 214 located on the rear panel 126 of the camera 100 that is connected to I/O (Data Input/Output) connectors of the processing unit 208 for displaying captured images on the light sensor 104, stored images, camera operation menus and camera configuration parameters, for instance, shutter speed, sensor sensitivity, aperture size etc. It is appreciated that the display 214 may be a touch screen.

A digital compass 216 and an inertial sensor 218 (which may include a gyroscope and an accelerometer) are connected to the processing unit 208. The inertial sensor 218 detects translational movement of the camera 100 based on 3D cartesian coordinate system, which takes reference from three axes, namely an x-axis 110 (horizontal axis), a y-axis 112 (vertical axis) and a z-axis 114 (axis normal to x-axis 110 and y-axis 112), that are orthogonal to one another. The digital compass 216 and the inertial sensor 218 are also used to detect rotational movement, i.e. pitch (p) 116, yaw (a) 118 and roll (r) 120, of the camera 100 about the x-axis 110, the y-axis 112 and the z-axis 114, respectively. In particular, the digital compass 216 is used to detect yaw movement. For movement detection in other directions, the inertial sensor 218 is used.

Furthermore, there are provided alarming means, one of which is a buzzer 220 connected to the processing unit 208 for producing an alerting sound to guide a user to take photographs under some of the photography modes. The other is an LED 222 connected to the processing unit 208 for producing light signals to guide the user to take photographs.

The driver circuit 202 includes a random access memory module 224 (RAM) for temporary storage of instructions and data including data of captured images, readings of light sensor 104, readings of the digital compass 216 and the inertial sensor 218.

In the example embodiment, the processing unit 208 acts as a timer for counting duration of hold time on the shutter button 108 and determines through I/O (Data Input/Output) connectors of the processing unit 208 connected to the shutter button 108, the state, e.g. 1 for ON and 0 for OFF, of the shutter button 108. During operation, data associated with the duration of hold time on the shutter button 108 and state of the shutter button 108 could be stored in the RAM 224 and/or the memory card 210.

Figure 3:
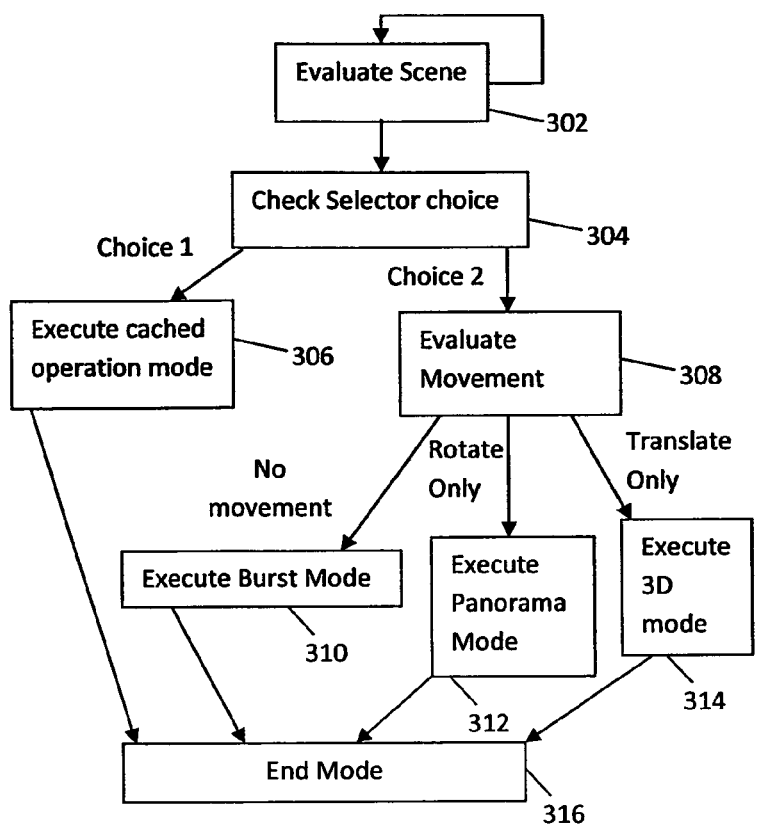
FIG. 3 shows a flowchart of an example embodiment of the present invention.

FIG. 3 shows a flowchart 300 for photography mode selection according to the example embodiment described with reference to FIGS. 1 and 2. The description as follow on FIG. 3 makes reference to the components in FIGS. 1 and 2.

At step 302, the light sensor 104 of the camera 100 senses scene lighting. The processing unit 208 evaluates data associated with the scene lighting gathered from the light sensor 104 according to instructions from the firmware of the camera 100. After scene evaluation at step 302 is carried out, an operation mode from a first set of operation modes based on scene lighting would be selected and cached. Scene evaluation takes place continuously as a background operation of the camera 100 and the selection of the operation mode from the first set of operation modes may change depending on the scene lighting, or in some embodiments, depending on user preference. Details on scene evaluation are described later with reference to FIG. 4.

At step 304, the camera 100 checks the selector, i.e. in this case, the shutter button 108, which is controlled by a user, to determine whether to proceed under one of the operation modes from the first set of operation modes selected and cached at step 302 (choice 1), or to continue to select an operation mode from a second set of operation modes (choice 2). Depending on data associated with the selection of the selector, the processing unit 208 proceeds under one of two choices. Details on checking of selector choice are described later with reference to FIG. 5.

At step 306, the processing unit 208 proceeds with the first choice, i.e. to execute the operation mode selected and cached at step 302.

At step 308, the processing unit 208 proceeds with the second choice, i.e. to evaluate movement of the camera 100 and select an operation mode from the second set of operation modes, which are based on movement of the camera 100. The data associated with the movement of the camera 100 are derived after detection by movement detection means of the camera 100. In the example embodiment, the movement detection means are the digital compass 216 and an inertial sensor 218. In another example embodiment, it is appreciated that the movement detection means could be movement detection using imaging, for instance, by comparing different frames of images captured on the light sensor 104 instead of relying on the digital compass 216 and/or inertial sensor 218 in the present example embodiment.

If there is no camera movement since step 302 is carried out, the processing unit 208 selects and executes the Burst mode at step 310.

If only rotational movement of the camera 100 is detected since step 302 is carried out, the processing unit selects and executes the Panorama photography mode at step 312.

If only translational movement of the camera 100 is detected since step 302 is carried out, the processing unit selects and executes the Stereoscopic photography mode at step 314.

After the selected operation mode has been executed, the operation mode is exited at step 316. The operation mode may exit by, for instance, shaking the camera 100, which can be detected by using the inertial sensor 218 to look for the presence of quick repetitive camera movement in opposing directions. Alternatively, the operation mode may exit after a predetermined number of photographs have been taken. Also, the operation mode may exit after the user selects an option to exit that is presented to the user in a graphics user interface displayed in the display 214 of the camera 100. Furthermore, the operation mode may exit after the user releases, for instance, the shutter button 108, which he/she may have held on for the selection and execution of certain operation modes.

Figure 4:
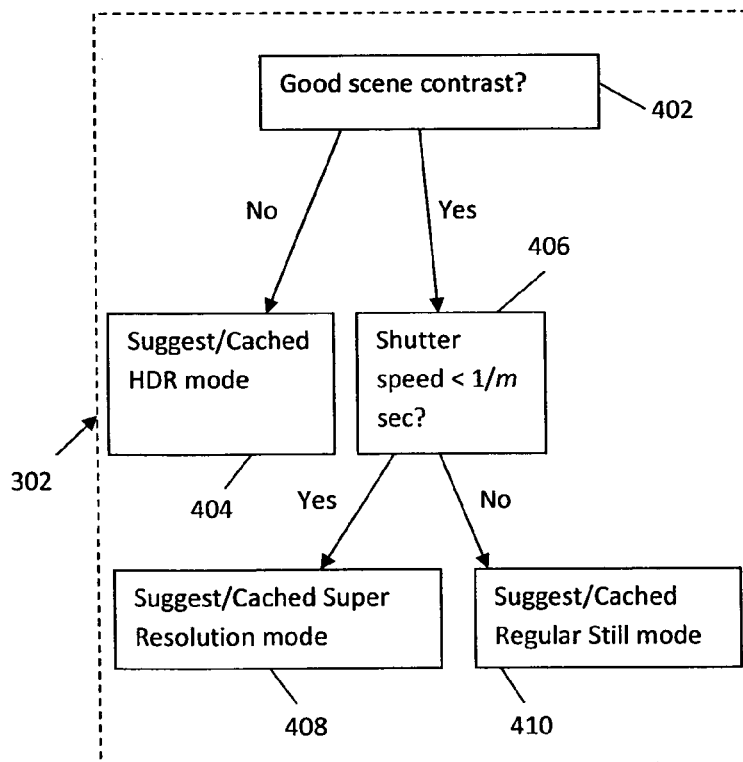
FIG. 4 shows a flowchart of an example embodiment of the present invention.

FIG. 4 details the steps taken for scene evaluation at step 302 of FIG. 3. The description as follow on FIG. 4 makes reference to the components in FIGS. 1 and 2, and the steps in FIG. 3.

At step 402, the camera 100 determines whether there is good scene contrast. It is noted that scene contrast is a lighting condition. The processing unit 208 compares the data associated with the scene contrast against threshold readings to determine whether the scene is over or under exposed. In the example embodiment, overexposure is the condition whereby the average or mean RGB (Red, Green Blue) readings retrieved from the light sensor 104 for the pixels of about 10% of the image captured by the light sensor 104 are above the values (250, 250, 250), which is closed to white saturation. Underexposure in the example embodiment is the condition whereby the average or mean RGB readings retrieved from the light sensor 104 for the pixels of about 10% of the image captured by the light sensor 104 are below the values (16, 16, 16). In the example embodiment, good scene contrast is defined to be the condition whereby the scene is not over or under exposed.

If good scene contrast is detected, the processing unit 208 proceeds to check the current shutter speed of the camera 100 against a threshold value at step 406 to see if the shutter speed is considered fast. The shutter speed is considered fast if the reading is less than 1/m sec. In the example embodiment, m equals to 200. It is noted that shutter speed is a measure for scene brightness. Scene brightness is also a lighting condition.

If the shutter speed is fast, the Super Resolution photography mode is cached or suggested at step 408. To be cached refers to storing the Super Resolution photography mode as a selection in the RAM 224 by the processing unit 208. To be suggested refers to presenting the Super Resolution photography mode to the user as an option for selection. The presentation could be made, for instance, via a graphics user interface displayed on the display 214 of the camera 100. In this case, the Super Resolution photography mode is cached by the processing unit 208 only if the user agrees to accept the option via the graphics user interface. If the user decides not to accept the option, the processing unit proceeds to cache the default mode, i.e. the Regular Still photography mode. Alternatively, in another example embodiment, the Super Resolution photography mode may be cached automatically by the processing unit 208 and is reverted to the Regular Still photography mode only if the user selects a presented option for the Super Resolution photography mode not to apply.

In the present example embodiment, the Super Resolution photography mode is cached and not suggested by the processing unit 208 at step 408.

If the shutter speed is slow, the Regular Still photography mode is cached at step 410.

If the image captured by the light sensor 104 at step 318 is over or under exposed, i.e. having bad scene contrast, the High Dynamic Range photography mode is cached or suggested at step 404. The meaning of cached and suggested here is the same as that described previously for the Super Resolution photography mode at step 408.

Figure 5:
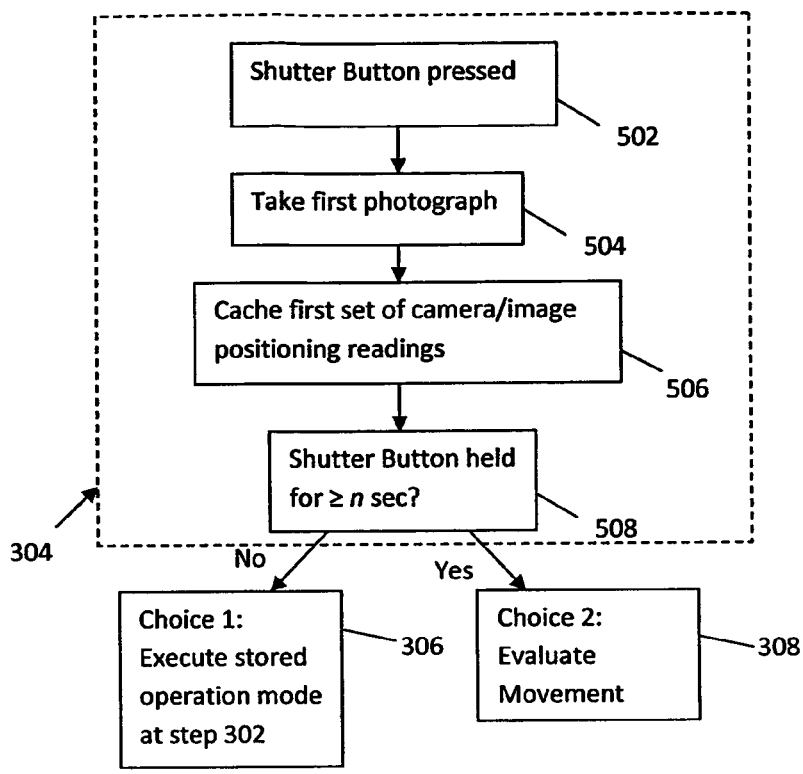
FIG. 5 shows a flowchart of an example embodiment of the present invention.

FIG. 5 details the steps taken for checking of selector choice at step 304 of FIG. 3. The description as follow on FIG. 5 makes reference to the components in FIGS. 1 and 2, and the steps in FIG. 3. The selector described in FIG. 5 is the shutter button 108.

At step 502, the shutter button 108 is pressed.

The camera 100 proceeds to take a first photograph at step 504 when the shutter button 108 is pressed.

At step 506, the processing unit 208 caches a first set of camera positioning readings derived from data associated with movement of the camera gathered from the digital compass 216 and the inertial sensor 218. In another example embodiment using imaging to detect movement of the camera, a first reference frame of the images captured by the light sensor 104 would be cached at this step. The first set of camera positioning readings with respect to the various axes shown in FIG. 1 would be represented herein by, $x_0, y_0, z_0, p_0, r_0$ and $a_0$.

At step 508, the processing unit 208 checks whether the shutter button 108 has been continuously pressed for n seconds. In the example embodiment, n equals to 1. This 1 second delay is provided for the user to move the camera 100 for the selection of the Panorama or Stereoscopic photography modes, if one of these modes is to be selected.

If the shutter button 108 is held for less than 1 second at step 508, the processing unit 208 will proceed with step 306 (choice 1), which is to execute the operation mode selected and cached during scene evaluation at step 302.

If the shutter button 108 is held for 1 second or more at step 508, the processing unit 208 will proceed with step 308 (choice 2), which is to evaluate movement of the camera 100 and select an operation mode from the second set of operation modes based on movement of the camera 100.

It is appreciated that in another example embodiment, the selector could be two separate buttons, where pressing one of the buttons would invoke step 306 (choice 1) and pressing the other button would invoke step 308 (choice 2). In this case, there is no need to hold on to the buttons and a delay may be deliberately introduced after the button for invoking step 308 (choice 2) is pressed so as to provide some time for the user to move the camera for the selection of the Panorama or Stereoscopic photography modes. It is appreciated that the aforementioned buttons/button could be selectable option(s) presented in a graphic user interface on a touch screen of the camera 100. Alternatively, the buttons/button could be selectable option(s) presented in a graphic user interface displayed on the display 214 and selection of the option(s) could be made through a visual marker in the graphic user interface which is controllable by the plurality of operation buttons 226.

Figure 6:
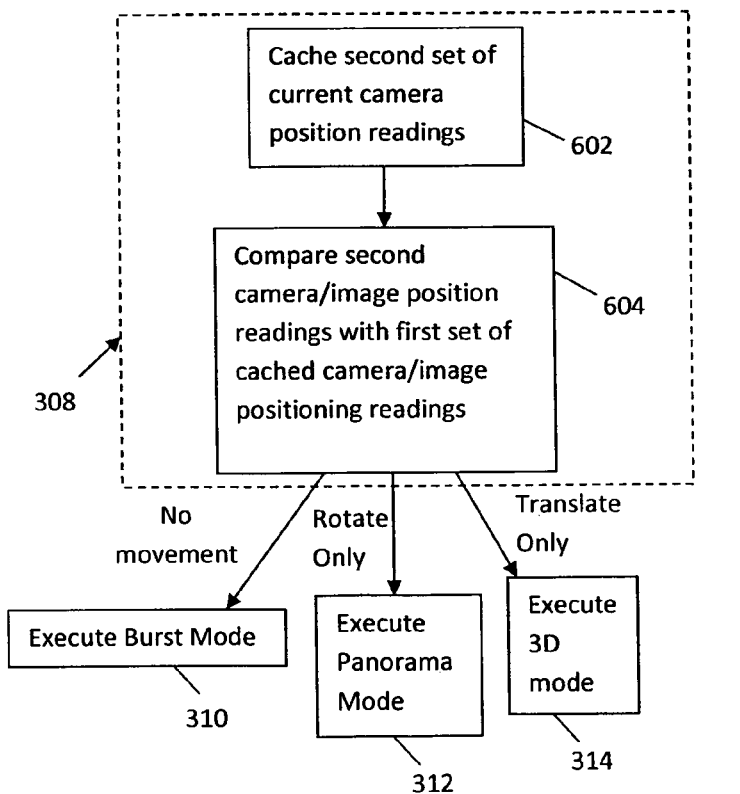
FIG. 6 shows a flowchart of an example embodiment of the present invention.

FIG. 6 details steps taken for evaluating movement of the camera 100 at step 308 of FIG. 3. The description as follow on FIG. 6 makes reference to the components in FIGS. 1 and 2, and the steps in FIG. 3.

At step 602, the processing unit 208 caches a second set of camera positioning readings derived from data associated with movement of the camera gathered from the digital compass 216 and the inertial sensor 218. In another example embodiment using imaging to detect movement of the camera, a second reference frame of the images captured by the light sensor 104 would be cached at this step.

At step 604, the processing unit 208 compares the second set of camera positioning readings with the first set of camera positioning readings cached at step 506 to determine the movement of the camera 100. In another example embodiment using imaging to detect movement of the camera, the second reference frame would be compared with the first reference frame of the images captured by the light sensor 104 to determine the camera movement. Based on data associated with the movement of the camera 100, the camera 100 would select and proceed under the Burst mode at step 310, Panorama photography mode at step 312 or the Stereoscopic photography mode at step 314 accordingly. The second set of camera positioning readings with respect to the various axes shown in FIG. 1 would be represented herein by $x_1, y_1, z_1, p_1, r_1$ and $a_1$.

In the example embodiment where the digital compass 216 and the inertial sensor 218 are used, the Panorama photography mode is executed at step 312 in FIG. 3 only when the conditions of one of the following equation sets are satisfied.

$|x_d|\approx 0, |y_d|\approx 0, |z_d|\approx 0, |a_d|\approx 0, |r_d|\approx 0$ and $|p_d|\geq P_0$   Equation set 1 or $|x_d|\approx 0, |y_d|\approx 0, |z_d|\approx 0, |p_d|\approx 0, |r_d|\approx 0$ and $|a_d|\geq A_0$   Equation set 2

$|x_d|$, $|y_d|$ and $|z_d|$ are the absolute values of the differences in translational readings between current camera position readings (e.g. those measured at step 604) and last camera position readings (e.g. those measured at step 506) with respect to the x-axis (110 in FIG. 1), y-axis (112 in FIG. 1) and the z-axis (114 in FIG. 1) respectively. The following equations apply, $|x_d|=|x_1-x_0|$, $|y_d|=|y_1-y_0|$ and $|z_d|=|z_1-z_0|$.

$|p_d|$, $|r_d|$ and $|a_d|$ are the absolute values of the differences in rotational readings in the pitch, roll and yaw directions respectively between current camera position readings (e.g. measured at step 604) and last camera position readings (e.g. measured at step 506). The following equations apply, $|p_d|=|p_1-p_0|$, $|r_d|=|r_1-r_0|$ and $|a_d|=|a_1-a_0|$.

$|x_d|\approx 0$, $|y_d|\approx 0$, $|z_d|\approx 0$ and $|a_d|\approx 0$ in equation sets 1 and 2 indicate no significant camera translational movement with respect to the x-axis 110, the y-axis 112 and the z-axis 114, and $|r_d|\approx 0$ indicates no camera rotational movement in the roll direction. $|a_d|\approx 0$ and $|p_d|\geq P_0$ indicate that no camera rotational movement has been detected in the yaw direction but rotational movement greater than or equal to a threshold $P_0$ value has been detected in the pitch direction. $|p_d|\approx 0$ and $|a_d|\geq A_0$ indicate that no camera rotational movement has been detected in the pitch direction but rotational movement greater than or equal to a threshold $A_0$ value has been detected in the yaw direction.

$P_0$ and $A_0$ are predetermined values indicating the minimum rotation the user should rotate the camera 100 in the pitch or yaw directions respectively for selecting the panorama photograph mode. It is appreciated that in another example embodiment having a more sophisticated panoramic photograph stitcher, instead of just taking a panoramic photograph with either a fixed pitch with varying yaw movement (Equation 2) or fixed yaw with varying pitch movement (Equation 1), pitch and yaw could both be varied to take a panoramic photograph.

After the Panorama photography mode is selected at step 312, a second photograph is taken and the camera position readings at that instance are cached. It is noted that the first photograph is taken at step 504 in FIG. 5. The camera position readings at this instance can be represented by $x_2$, $y_2$, $z_2$, $p_2$, $r_2$ and $a_2$. A third photograph, fourth photograph, . . . and so on would be taken after the second photograph is taken provided that certain predetermined photograph image quality criteria are satisfied, the camera 100 is unchanged in direction of movement from the direction of camera movement prior to the last caching of camera position readings, and the comparison results of the current and last cached camera position readings satisfy the conditions of one of the equation sets as follow:

$|x_d|\approx 0, |y_d|\approx 0, |z_d|\approx 0, |a_d|\approx 0, |r_d|\approx 0$ and $P_1\geq |p_d|\geq P_2$   Equation set 3 or $|x_d|\approx 0, |y_d|\approx 0, |z_d|\approx 0, |p_d|\approx 0, |r_d|\approx 0$ and $A_1\geq |a_d|\geq A_2$   Equation set 4

The definitions of $|x_d|$, $|y_d|$, $|z_d|$, $|p_d|$, $|r_d|$ and $|a_d|$ in equation set 3 and 4 are the same as the definitions of the same for equation sets 1 and 2 discussed previously. However, with regard to photographs taken beyond the second photograph that is taken under the Panorama photography mode, the following equations apply, $|x_d|=|x_2-x_3|$, $|y_d|=|y_2-y_3|$, $|z_d|=|z_2-z_3|$, $|p_d|=|p_2-x_3|$, $|r_d|=|r_2-r_3|$ and $|a_d|=|a_2-a_3|$, where $x_2$, $y_2$, $z_2$, $p_2$, $r_2$ and $a_2$ are camera position readings cached at the time the second photograph is taken when the Panorama photography mode is selected and $x_3$, $y_3$, $z_3$, $p_3$, $r_3$ and $a_3$ are camera position readings cached at the time the third photograph is taken under the Panorama photography mode.

$P_1$ and $A_1$ are predetermined values indicating the minimum rotation the user should rotate the camera 100 in the pitch or yaw directions respectively for proper panorama photograph taking. Rotations in the respective directions with values less than $P_1$ and $A_1$ would provide excessive overlapping region between a previously taken photograph and a subsequent photograph to be taken. It is noted that sufficient overlapping region is necessary for panorama photograph taking. For example, sufficient overlapping region could be defined as at least 50% of the previous photograph taken is overlapping with, or in other words, is identical to, the subsequent photograph to be taken.

$P_2$ and $A_2$ are predetermined values indicating the maximum rotation the user should rotate the camera 100 in the pitch or yaw directions respectively for proper panorama photograph taking. Rotations in the respective directions with values beyond $P_2$ and $A_2$ would mean that there is inadequate overlapping region between a previously taken photograph and a subsequent photograph to be taken.

It is appreciated that suitable tolerance values could be devised for the processing unit 208 to make the decision as to what range of values would be regarded as approximately $P_0$, $A_0$, $P_1$, $A_1$, $P_2$, $A_2$ and zero. These values can be acquired after conducting numerous empirical tests.

In the example, embodiment described previously where the selector is the shutter button 108, the camera 100 would remain in the Panorama photography mode for as long as the shutter button 108 is continued to be pressed. In the example embodiment mentioned previously where the selector consists of two buttons, the camera 100 remains in the Panorama photography mode until the button that was pressed to enter the Panorama photography mode is pressed a second time. It is appreciated that, alternatively, the shutter button 108 may be pressed to exit the Panorama photography mode instead of pressing a second time the button that was pressed to enter the Panorama photography mode. The Panorama photography mode may also exit after a long period of time has lapsed (e.g. no photograph taking condition is satisfied after 30 seconds) and image quality conditions for taking a photograph are still not satisfied. Furthermore, the Panorama photography mode may exit by shaking the camera 100.

The photograph image quality criteria relate to image quality in the overlapping region between a previously taken photograph and an image that is captured by light sensor 104 but has yet to be saved as a photograph. An algorithm is utilized to evaluate the image quality of the image after equation set 3 or 4 is satisfied. The best image quality photograph within the overlapping region would be stored as stitching material for the final panorama photograph (i.e. one of the photographs stitched up to form the final panorama photograph).

If equation sets 3 or 4 are not satisfied, the camera 100 would wait for the user to adjust the camera 100 until the conditions are satisfied before taking a photograph automatically. The buzzer 220 may be configured to sound and/or the LED 222 may be configured to light up if the conditions of equation set 3 or 4 are not met within a stipulated time period (e.g. 1 second) after a photograph is taken and another photograph is set to be taken or the image quality of the overlapping region remains unacceptable within the stipulated time period. When that happens, the user would be alarmed to adjust the camera position until the conditions are satisfied. The buzzer 220 and LED 222 would be deactivated when the conditions are satisfied or when the Panorama photography mode is exited.

When the Panorama photography mode exits and more than two photographs have been successfully taken in succession, the processing unit 208 will stitch all the photographs that have been taken to one another to form a panoramic photograph that is running continuously in the yaw or/and pitch direction, where applicable, using known Panorama photograph stitching algorithms. It is appreciated that in an alternative embodiment, the stitching of the more than one photograph taken to produce a panoramic photograph could be configured to take place every time a photograph is taken under the Panorama photography mode instead of stitching all the photographs taken all at one time after the Panorama photograph has ended.

In the example embodiment where the digital compass 216 and the inertial sensor 218 are used, the Stereoscopic photography mode is executed at step 314 in FIG. 3 only when the conditions of one of the following equation sets are satisfied.

$$|y_d|{\approx}0, |z_d|{\approx}0, |x_d|{\geq}T_x, |a_d|{\approx}0, |p_d|{\approx}0 \text{ and } |r_d|{\approx}0 \qquad \text{Equation set 5}$$

or $$|y_d|{\geq}T_y, |z_d|{\approx}0, |x_d|{\approx}0, |a_d|{\approx}0, |p_d|{\approx}0 \text{ and } |r_d|{\approx}0 \qquad \text{Equation set 6}$$

The definitions of $|x_d|$, $|y_d|$, $|z_d|$, $|p_d|$, $|r_d|$ and $|a_d|$ in equation set 5 and 6 are the same as the definitions of the same for equation sets 1, 2, 3 and 4 discussed previously. The following equations apply for equation sets 5 and 6, $|x_d|=|x_1-x_0|$, $|y_d|=|y_1-y_0|$, $|z_d|=|z_1-z_0|$, $|p_d|=|p_1-p_0|$, $|r_d|=|r_1-r_0|$ and $|a_d|=|a_1-a_0|$.

$|a_d|{\approx}0$, $|p_d|{\approx}0$ and $|r_d|{\approx}0$ indicate no camera rotational movement detected. $|y_d|{\approx}0$, $|z_d|{\approx}0$ and $|x_d|{\geq}T_x$ indicate that there are no camera translational movements along the y-axis 112 and the z-axis 114 but there is camera movement detected along the x-axis 110. $|z_d|{\approx}0$, $|x_d|{\approx}0$ and $|y_d|{\geq}T_y$, indicate that there are no camera translational movements along the x-axis 110 and the z-axis 114 but there is camera movement detected along the y-axis 112.

$T_x$ and $T_y$ are predetermined values indicating the minimum movement the user should move the camera 100 in the pitch or yaw directions respectively for selecting the Stereoscopic photography mode.

When the Stereoscopic photography mode is selected, at step 314, a second photograph is taken and the camera position readings at that instance are cached. It is noted that the first photograph is taken at step 504 in FIG. 5. A third photograph, fourth photograph, ... and so on until a predetermined number would be taken after the second photograph is taken provided that the camera 100 is unchanged in direction of movement from the direction of camera movement prior to the last caching of camera position readings, and the comparison results of the current and last cached camera position readings satisfy the conditions of one of the following equation sets:

$$|y_d|{\approx}0, |z_d|{\approx}0, |x_d|{\geq}T_{x1}, |a_d|{\approx}0, |p_d|{\approx}0 \text{ and } |r_d|{\approx}0 \qquad \text{Equation set 7}$$

or $$|y_d|{\geq}T_{y1}, |z_d|{\approx}0, |x_d|{\approx}0, |a_d|{\approx}0, |p_d|{\approx}0 \text{ and } |r_d|{\approx}0 \qquad \text{Equation set 8}$$

The definitions of $|x_d|$, $|y_d|$, $|z_d|$, $|p_d|$, $|r_d|$ and $|a_d|$ in equation sets 7 and 8 are the same as the definitions of the same for equation sets 1, 2, 3, 4, 5 and 6 discussed previously. The following equations apply for equation sets 7 and 8, $|x_d|=|x_2-x_3|$, $|y_d|=|y_2-y_3|$, $|z_d|=|z_2-z_3|$, $|p_d|=|p_2-p_3|$, $|r_d|=|r_2-r_3|$ and $|a_d|=|a_2-a_3|$, where $x_2$, $y_2$, $z_2$, $p_2$, $r_2$ and $a_2$ are camera position readings cached at the time the second photograph is taken when the Stereoscopic photography mode is selected and $x_3$, $y_3$, $z_3$, $p_3$, $r_3$ and $a_3$ are camera position readings cached at the time the third photograph is taken under the Stereoscopic photography mode.

$T_{x1}$ and $T_{y1}$ are predetermined values indicating the minimum movement the user should move the camera 100 in the x and y translational directions respectively (i.e. along x-axis 110 and y-axis 112 respectively) for proper 3D photograph taking. Camera movements with values less than $T_{x1}$ and $T_{y1}$ would indicate that there is insufficient distance between a previously taken photograph and a subsequent photograph to be taken in the respective directions for proper 3D photograph taking.

It is appreciated that suitable tolerance values could be devised for the processing unit 208 to make the decision as to what range of values would be regarded as approximately $T_x$, $T_y$, $T_{x1}$, $T_{y1}$ and zero.

In the example embodiment described previously where the selector is the shutter button 108, the camera 100 remains in the Stereoscopic photography mode for as long as the shutter button 108 is continued to be pressed. In the example embodiment mentioned previously where the selector consists of two buttons, the camera 100 remains in the Stereoscopic photography mode until the button that was pressed to enter the Stereoscopic photography mode is pressed a second time. It is appreciated that, alternatively, the shutter button 108 may be pressed to exit the Stereoscopic photography mode instead of pressing a second time the button that was pressed to enter the Stereoscopic photography mode. The Stereoscopic photography mode may also exit after a predetermined number of photographs (e.g. 2 or 5) have been taken and if image quality conditions (e.g. no motion blurring etc.) for taking a photograph are still not satisfied after a long period of time (e.g. 30 seconds). Furthermore, the Stereoscopic photography mode may exit by shaking the camera 100.

If equation sets 7 or 8 are not satisfied, the camera 100 would wait for the user to adjust the camera 100 until the conditions are satisfied before taking a photograph automatically. The buzzer 220 may be configured to sound and/or the LED 222 may be configured to light up if the conditions of equation sets 7 or 8 are not met within a stipulated time period (e.g. 1 second) after a photograph is taken and another photograph is set to be taken. When that happens, the user would be alarmed to adjust the camera position until the conditions are satisfied. The buzzer 220 and LED 222 would be deactivated when the conditions are satisfied or when the Stereoscopic photography mode is exited.

When the Stereoscopic photography mode exits and more than two photographs have been successfully taken in succession, the photographs would be merged to form one 3D photograph and be stored in the removable solid-state memory card 210 using known 3D based photograph merging algorithms.

In the example embodiment where the digital compass 216 and the inertial sensor 218 are used, the Burst mode is automatically selected at step 310 only when the following equation set is satisfied.

$$|x_d|{\approx}0, |y_d|{\approx}0, |z_d|{\approx}0, |a_d|{\approx}0, |p_d|{\approx}0 \text{ and } |r_d|{\approx}0 \qquad \text{Equation set 9}$$

The definitions of $|x_d|$, $|y_d|$, $|z_d|$, $|p_d|$, $|r_d|$ and $|a_d|$ in equation set 9 are the same as the definitions of the same for equation sets 1 to 8 discussed previously. Since all the readings are approximately zero, it means that the camera 100 remains substantially stationary after the first set of camera position readings have been cached at step 504.

When Burst mode is selected, at step 310, a second photograph would be taken. It is noted that the first photograph is taken at step 504 in FIG. 5. A third photograph, a fourth photograph, . . . and so on, would be taken, for instance, at every 1 second or as fast as possible after the second photograph is taken regardless of image quality and the camera position readings. It is appreciated that in another example embodiment, every photograph taken under the Burst mode could be subjected to image quality check prior to the automatic photograph taking by the camera 100. In this case, a photograph would be taken only if predetermined image quality criteria are met.

In the example embodiment described previously where the selector is the shutter button 108, the camera 100 would remain in the Burst mode for as long as the shutter button 108 is continued to be pressed. The Burst mode also exits if a predetermined number of photograph shots (typically 5) have been taken.

When the Super Resolution photography mode is in operation after selection at step 306, a second photograph is taken and the camera position readings at that instance are cached. It is noted that the first photograph is taken at step 504 in FIG. 5. Photographs taken, including the second photograph and subsequent photographs, are taken provided that the comparison between the current and last cached camera position readings satisfy the conditions defined by equation set 10 as follow.

$$|x_d|\approx 0, |y_d|\approx 0, |z_d|\approx 0, |a_d|\approx 0, |p_d|\approx 0 \text{ and } |r_d|\approx 0 \qquad \text{Equation set 10}$$

The definitions of $|x_d|$, $|y_d|$, $|z_d|$, $|p_d|$, $|r_d|$ and $|a_d|$ in equation set 10 are the same as the definitions of the same for equation sets 1 to 9 discussed previously. Since all the readings are approximately zero, it means that the camera 100 has to remain substantially stationary after the activation of the Super Resolution photography mode in order to take the photographs automatically.

The buzzer 220 may be configured to sound and/or the LED 222 may be configured to light up if the conditions of equation set 10 are not met within a stipulated time period (e.g. 0.5 second) after a photograph is taken and another photograph is set to be taken. When that happens, the user would be alarmed to adjust the camera position until the conditions are satisfied. The buzzer 220 and LED 222 would be deactivated when the conditions are satisfied.

The Super Resolution photography mode exits when a predetermined number of photograph shots have been taken and when image quality conditions (e.g. no motion blurring etc.) for taking a photograph are not satisfied after a long period of time (e.g. 2 seconds). It is noted that the satisfying of image quality conditions for taking a photograph is optional. At the time of exit, if more than two photographs have been successfully taken in succession, the processing unit 208 will combine all the photographs taken to one another to form one Super Resolution photograph using known Super Resolution photograph combining algorithms.

It is appreciated that, in another example embodiment, for user convenience under the Super Resolution photography mode, it is not a requirement to satisfy the conditions of equation set 10 in order to take photographs.

When the HDR photography mode is in operation after selection at step 306, a second photograph is taken and the camera position readings at that instance are cached. It is noted that the first photograph is taken at step 504 in FIG. 5 and it is taken with normal exposure settings. The second photograph is taken with another exposure setting (e.g. underexposed setting). Following that, a third photograph is taken with yet another exposure setting (e.g. overexposed setting). Fourth and fifth photographs and so on up to a pre-determined number of photographs with different exposure rates may be taken thereafter. All the photographs are taken provided that the comparison results of the current and last cached camera position readings satisfy the conditions defined by the following equation set.

$$|x_d|\approx 0, |y_d|\approx 0, |z_d|\approx 0, |a_d|\approx 0, |p_d|\approx 0 \text{ and } |r_d|\approx 0 \qquad \text{Equation set 11}$$

The definitions of $|x_d|$, $|y_d|$, $|z_d|$, $|p_d|$, $|r_d|$ and $|a_d|$ in equation set 11 are the same as the definitions of the same for equation sets 1 to 10 discussed previously. Since all the readings are approximately zero, it means that the camera 100 has to remain substantially stationary after the activation of the HDR photography mode in order to take the photographs automatically.

The exposure levels of the photographs taken under the HDR photography mode may be in the range between, for instance, −2 EV (underexposing) to +2 EV (overexposing). A normal exposure photograph would be taken at 0 EV. Exposure could be defined as a function of shutter speed, aperture size and sensor sensitivity of the camera 100 and it could be varied by adjusting one or more of these stated parameters. In the example embodiment, the shutter speed of the camera 100 is varied to achieve different exposure levels, while the aperture size and the sensor sensitivity are kept constant. In the example embodiment, the extent of shutter speed to vary for taking multiple shots with different exposure levels under HDR mode is predetermined and hardcoded to the camera 100.

In the example embodiment, if the ambient lighting condition has been detected by the camera 100 to be dark conditions, e.g. at night, the predetermined minimum number of photographs to be taken by the camera 100 would be automatically set to 2, i.e. one photograph to be taken at 0 EV and another one at −2 EV. Taking one or more photographs in the range of 0 EV to +2 EV or higher under such scene lighting contrast conditions is omitted as it may result in blur photographs. If the ambient lighting condition has been detected by the camera 100 to be bright conditions, the predetermined minimum number of photographs to be taken by the camera 100 would be automatically set to 3, i.e. with one photograph taken at 0 EV, one at −2 EV and one at +2 EV. Hence, advantageously, the example embodiment is capable of automatically and dynamically taking 2 to N number of photographs based on ambient lighting conditions.

The buzzer 220 may be configured to sound and/or the LED 222 may be configured to light up if the conditions of equation set 11 have ceased to be satisfied (i.e. the user has moved the camera) within a stipulated time period (e.g. 1 second) after a photograph is taken and another photograph is set to be taken. When that happens, the user would be alarmed to adjust the camera position until the conditions are satisfied. The buzzer 220 and LED 222 would be deactivated when the conditions are satisfied or when the HDR photography mode exits.

The HDR photography mode exits when the predetermined number of photograph shots has been taken and when the image quality conditions (e.g. no motion blurring) for taking a photograph are not satisfied after a long period of time (e.g. 30 seconds). It is noted that the satisfying of image quality conditions for taking a photograph is optional. In the example embodiment described previously where the selector is the shutter button 108, the HDR photography mode may also exit when the shutter button 108 is released after it is pressed. At the time of exit, if more than two photographs have been successfully taken in succession, the photographs would be merged to form one HDR photograph and be stored in the removable solid-state memory card 210 using known HDR based photograph merging algorithms.

It is appreciated that in another example embodiment, for user convenience under the HDR photography mode, it is not a requirement to satisfy the conditions of equation set 11 in order to proceed to take photographs.

Figure 7:
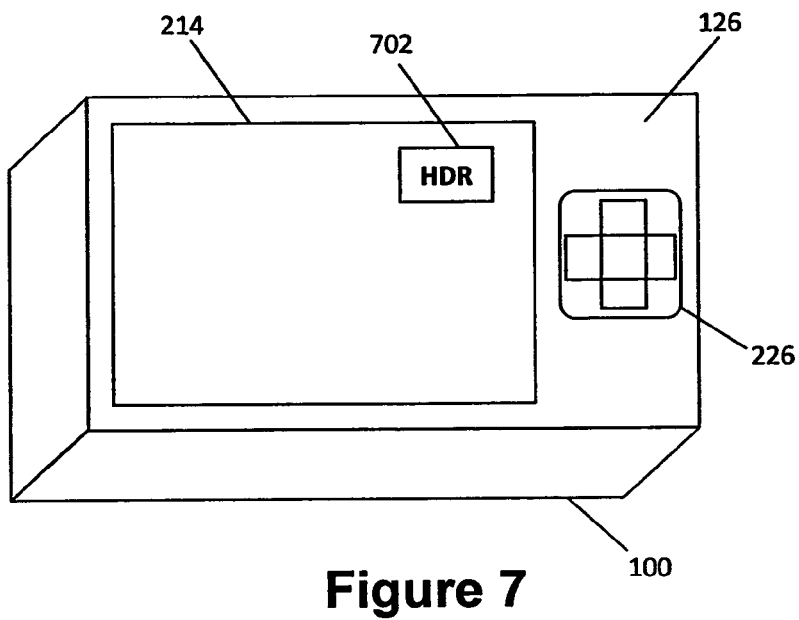
FIG. 7 shows a rear perspective view of a camera of an example embodiment of the present invention.

It is appreciated that the selector of the camera 100 described earlier may be one or more selectable options displayed in the display 214 of the camera 100. The one or more selectable options are associated with the Super Resolution or HDR photography modes and are displayed when the respective mode has been cached or suggested at steps 404 or 408 of FIG. 4. For instance, with reference to FIG. 7, an icon 702 may be displayed for HDR photography mode to indicate that it is cached and the user can exit the HDR photography mode by manually selecting the icon 702 using the plurality of operation buttons 226. Alternatively, the icon 702 may be displayed due to a suggestion by the camera 100 for a particular mode and selecting the icon 702 in this case would select the operation mode. It is appreciated that in an alternative embodiment where the display 214 is a touch screen, the selectable options could be selected/exited by touching the displayed options on the touch screen.

It is appreciated that in the camera 100 of the example embodiment, any one of the aforementioned camera photography modes are configurable in the sense that they could be switched on/off from automatic selection. A switched off photography mode would not be automatically activated by the camera 100 even when its conditions for selection are satisfied.

Equation sets 1 to 11 are examples on the use of hard decision approaches in which the decision to select the photography mode is made based on fixed conditions. It is appreciated that soft decision approaches may also be adopted in other example embodiments. For instance, neural network, fuzzy logic, implementations involving machine learning/training, and the like, could be employed. In the case of soft decision approaches, the conditions determining the photography mode selection decision evolve and adapt to user usage patterns.

It is mentioned earlier that camera movement detection could be based on imaging, i.e. comparison between images captured by the light sensor 104 of the camera 100 at predetermined time intervals, instead of using the digital compass 216 and the inertial sensor 218. For instance, computer vision techniques making use of OpenCV, a computer vision library, may be employed. Generally, the steps involved may include the camera 100 capturing images, T1, T2, T3, . . . and so on, at predetermined intervals, e.g. at about 30 or 60 frames per second. Thereafter, among all the images captured, two or more images are kept as reference images (e.g. the first reference frame cached at step 506 or the second reference frame cached at step 602) for comparison. An appropriate algorithm is utilized to calculate the homography between the reference image and the current image. A photography mode is then selected according to the camera movements derived from the homography. In another example embodiment, it is appreciated that the camera could employ one or more methods of camera movement detection, for instance, use imaging, use the digital compass 216 and/or use the inertial sensor 218 to detect camera movement.

Figure 8:
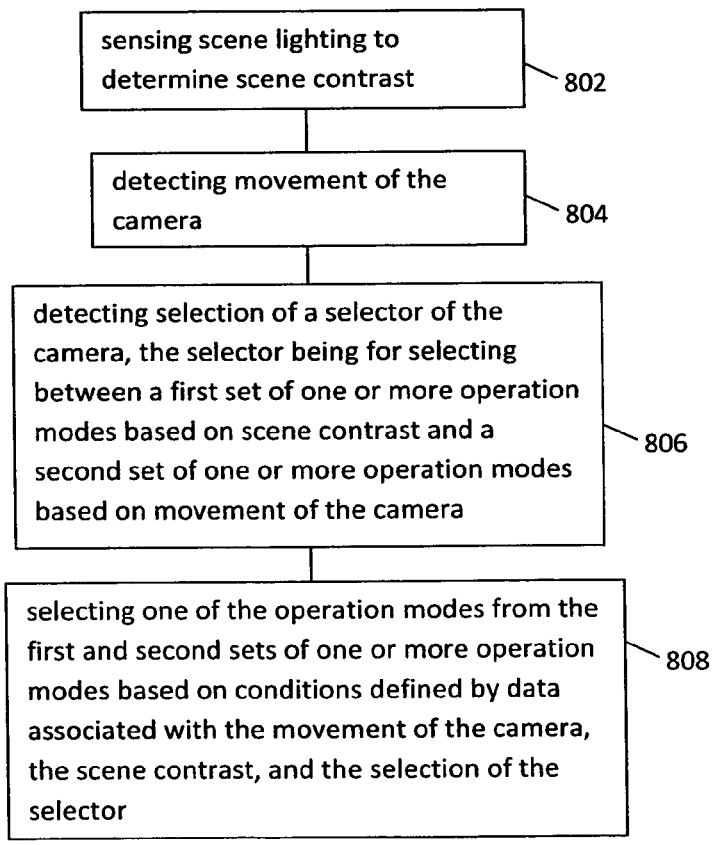
FIG. 8 shows a flowchart of a method according to an example embodiment of the present invention.

With reference to FIG. 8, a method for selecting an operation mode of a camera according to an example embodiment of the present invention is described as follow.

At step 802, sensing scene lighting (e.g. step 402 and 406 in FIG. 4).

At step 804, detecting movement of the camera (e.g. step 308 in FIG. 3).

At step 806, detecting selection of a selector of the camera, the selector being for selecting between a first set of one or more operation modes based on scene lighting and a second set of one or more operation modes based on movement of the camera (e.g. step 304 in FIG. 3).

At step 808, selecting one of the operation modes from the first and second sets of one or more operation modes based on conditions defined by data associated with the movement of the camera, the scene lighting, and the selection of the selector.

It is appreciated that in other example embodiments, the digital camera 100 as described with reference to FIG. 1 could instead be a camera module embedded in a portable device (e.g. mobile phone, portable digital assistant, a portable gaming device etc.), a webcam, a video camera or the like.

Many modifications and other embodiments can be made to the multimodal camera and the method for selecting an operation mode of a camera by those skilled in the art having the understanding of the above described disclosure together with the drawings. Therefore, it is to be understood that multimodal camera and the method for selecting an operation mode of a camera is not to be limited to the above description contained herein only, and that possible modifications are to be included in the claims of the disclosure.

The invention claimed is:

1. A method for automatic selection and transitioning between operation modes of a camera having a processing unit and a light sensor, the operation modes comprising a first set of operation modes having one or more operation modes and a second set of operation modes having one or more operation modes, the method comprising:
   sensing scene lighting using the light sensor so as to obtain lighting data;
   selecting and caching, using the processing unit, an operation mode from the first set of operation modes, the processing unit performing selection and caching based on the lighting data;
   detecting movement of the camera, detection of movement of the camera being based on whether the camera itself has been moved based on rotational movement or translational movement; and
   detecting selection of a selector of the camera, the selector being for selecting between the first set of operation modes and the second set of operation modes,
   wherein if based on detected selection of the selector, the first set of operation modes is selected, the operation mode selected and cached based on scene lighting is executed, and
   wherein if based on detected selection of the selector, the second set of operation modes is selected:
      a first operation mode from the second set of operation modes is selected and executed if rotational movement of the camera is detected,
      a second operation mode from the second set of operation modes is selected and executed if translation movement of the camera is detected, and
      a third operation mode from the second set of operation modes is selected and executed if no camera movement is detected.

2. The method as claimed in claim 1, the method further comprising:
   detecting duration of hold time on the selector, wherein selection of the selector is associated with the duration of hold time on the selector.

3. The method as claimed in claim 1, the method further comprising:
selecting the first set of one or more operation modes through a first button of the selector; and
selecting the second set of one or more operation modes through a second button of the selector.

4. The method as claimed in claim 1, the method further comprising:
alarming and guiding a user of the camera to fulfill conditions for image capturing under the operation mode.

5. The method as claimed in claim 1, the method further comprising:
determining shutter speed of the camera; and
selecting the operation mode based on the shutter speed of the camera.

6. The method as claimed in claim 1, wherein detecting the movement of the camera comprises comparison between images captured by the light sensor at predetermined time intervals.

7. The method as claimed in claim 1, wherein detecting the movement of the camera comprises using a digital compass, an inertial sensor or both.

8. The method as claimed in claim 1, the method further comprising:
displaying one or more selectable options in a display; and
selecting the one or more selectable options to select or exit an operation mode.

9. The method of claim 1 wherein data associated with movement of the camera are derived after detection of movement of the camera.

10. A method for automatic selection and transitioning between operation modes of a camera, the operation modes comprising a first set of operation modes having one or more operation modes and a second set of operation modes having one or more operation modes, the method comprising:
sensing scene lighting;
selecting and caching an operation mode from the first set of operation modes based on scene lighting;
detecting movement of the camera; and
detecting selection of a selector of the camera, the selector being for selecting between the first set of operation modes and the second set of operation modes,
wherein if based on detected selection of the selector, the first set of operation modes is selected, the operation mode selected and cached based on scene lighting is executed,
wherein if based on detected selection of the selector, the second set of operation modes is selected, an operation mode from the second set of operation modes is selected and executed based on detected movement of the camera,
wherein when the second set of operation modes is selected and if no movement of the camera is detected, a default operation mode from the second set of operation modes is selected and executed,
wherein the second set of operation modes includes:
Burst photograph taking mode;
Panorama mode; and
Stereoscopic photography mode,
wherein the default mode is Burst photograph taking mode,
wherein if detected movement of the camera is rotational, Panorama mode is selected and executed, and
wherein if detected movement of the camera is translational, Stereoscopic photography mode is selected and executed.

* * * * *